United States Patent [19]
Hawthorne et al.

[11] Patent Number: 5,864,485
[45] Date of Patent: Jan. 26, 1999

[54] GRIDLOCK DETECTION AND ALLEVIATION FOR PNEUMATIC CARRIER SYSTEMS

[75] Inventors: Jeffrey Scott Hawthorne, Bennett; David Michael Dillon, Aurora; Gregory R. Chaney, Parker; Benjamin L. Lopez, Arvada, all of Colo.

[73] Assignee: TransLogic Corporation, Denver, Colo.

[21] Appl. No.: 648,479

[22] Filed: May 20, 1996

[51] Int. Cl.[6] .......................... B65G 51/40; G06F 19/00
[52] U.S. Cl. .............................. 364/478.17; 364/478.14; 104/88.04; 406/3
[58] Field of Search ................... 364/478.01, 478.14, 364/478.16, 478.17; 406/3, 10, 11, 12, 19; 104/138.2, 88.03, 88.04, 130.01

[56] References Cited

U.S. PATENT DOCUMENTS

| | | | |
|---|---|---|---|
| 2,679,990 | 6/1954 | Mathzeit et al. | 406/4 |
| 2,710,728 | 6/1955 | Halpern | 406/3 |
| 2,893,660 | 7/1959 | Cook et al. | 406/3 |
| 3,236,475 | 2/1966 | Mach et al. | 406/19 |
| 3,627,231 | 12/1971 | Kalthoff | 406/3 |
| 3,817,476 | 6/1974 | Martin | 406/37 |
| 3,951,461 | 4/1976 | De Feudis | 406/3 |
| 4,058,274 | 11/1977 | Hochradel et al. | 406/2 |
| 4,354,775 | 10/1982 | Jalas | 406/3 |
| 4,563,112 | 1/1986 | Mokuya et al. | 406/11 |
| 4,630,216 | 12/1986 | Tyler et al. | 364/478.17 |
| 4,766,547 | 8/1988 | Modery et al. | 364/478.17 |
| 5,038,290 | 8/1991 | Minami | 364/436 |
| 5,165,826 | 11/1992 | Egbert | 406/182 |
| 5,217,328 | 6/1993 | Lang | 406/1 |
| 5,234,292 | 8/1993 | Lang | 406/3 |
| 5,237,931 | 8/1993 | Riedl | 104/88.04 |
| 5,267,173 | 11/1993 | Tanizawa et al. | 364/478.17 |
| 5,375,691 | 12/1994 | Wirtz | 198/350 |
| 5,682,820 | 11/1997 | Arata | 104/88.04 |

*Primary Examiner*—Eric W. Stamber
*Attorney, Agent, or Firm*—Holme Roberts & Owen

[57] ABSTRACT

A pneumatic carrier system is provided for distribution and transport of materials between different locations. The system includes a plurality of carriers for conveyance of materials and a control system for controlling the movement of the carriers in the system. The control system uses information associated with the carriers and the status of areas of the system to detect gridlock conditions which inhibit the movement of carriers. The system also includes bypass locations which are used to resolve detected gridlock conditions.

22 Claims, 9 Drawing Sheets

GRIDLOCK DETECTION AND ALLEVIATION FOR PNEUMATIC CARRIER SYSTEMS

FIELD OF THE INVENTION

The present invention relates generally to the field of pneumatic carrier systems and, more particularly, to detecting and alleviating gridlock conditions in pneumatic tube systems.

BACKGROUND OF THE INVENTION

Pneumatic carrier systems for the distribution and transport of materials may connect a multitude of locations, any of which may be the initial source or ultimate destination of a particular carrier. The pneumatic tubes which connect these locations, or stations, may be arranged in a manner which permits carriers from various source stations to pass through a particular section of a pneumatic tube. When the paths of two of the carriers conflict, a gridlock condition may occur, which does not permit either carrier to proceed. Another form of gridlock occurs when a number of carriers become stalemated and unable to move forward due to the presence of the other carriers in the system.

One method of avoiding gridlock is to reserve all of the sections of tube which are necessary for the path of a particular carrier from its source to its destination until the complete path has been traversed. However, this method of avoiding gridlock is inefficient, as it causes all sections of tube in the path, other than the instant location of the carrier, to be idle until the carrier has completed the entire reserved path. As a result, a large portion of the system may be idle at any one time, resulting in inefficiency.

SUMMARY OF THE INVENTION

The present invention provides an improved system for detecting and alleviating gridlock conditions in pneumatic carrier systems. In particular, the present invention permits the resolution of gridlock situations both in individual zones of the system and across the system. The present invention provides the advantage of increased efficiency in system use, as well as improvements in delivery times and reductions in wait times at stations.

The various aspects of the present invention are embodied in a pneumatic carrier system which includes stations, zones, interzones and bypass pipes. The movement of various carriers within the system is regulated by a control system which includes digital processing capability. The control system has the capability of recognizing gridlock situations and taking action to rectify a gridlock situation. The control system also has the capability to control the pneumatic operation of the system, thus causing the carriers in the system to move through the system in accordance with control signals generated by the control system.

A particular carrier containing an object or material may originate at any station which is connected to the system and may have any other station which is connected to the system as its destination. Each station is connected to the system at a zone, and the zones are connected to each other. The connection between each pair of zones is the interzone region, or interzone. Bypass pipes are connected to each intermediate zone, which are the zones that are connected to more than one other zone.

Each carrier in use in the system is identified to the control system as a unique transaction. The control system uses transaction information and information relating to the status of other parts of the system to control the movement of carriers in the system. The control system also uses this information to detect and alleviate gridlock conditions. The control system includes a central system controller which communicates with the zones. Each zone includes a zone processor and a transfer unit, which accomplishes some of the physical switching that is required to control the movement of carriers in the system. Pressure is supplied to the system by blowers connected to transfer units.

Each transaction has a unique identifier, an associated priority and an associated route list which identifies the source station, the destination station, and the interzones which comprise the route between the stations. The control system may determine the status of interzones by using transaction information.

A gridlock condition is detected by identifying a group of transactions which may not proceed to the next interzone in their route list because another transaction is occupying or has reserved the destination interzone. A gridlock condition may exist in connection with a particular zone, causing a zone gridlock. If a zone gridlock is detected, a pair of relieving transactions is identified and one of the transactions is temporarily routed to a bypass pipe, allowing resolution of the conflict.

A broader system gridlock condition may also occur. If a system gridlock is detected, a pair of relieving transactions is identified. The route list of one of the relieving transactions is then modified to reduce the system gridlock condition to a zone gridlock condition. Following this reduction, the resulting zone gridlock condition is resolved by temporarily routing one of the transactions to a bypass pipe, allowing resolution of the conflict.

BRIEF DESCRIPTION OF THE DRAWINGS

For a more complete understanding of the present invention and further advantages thereof, reference is now made to the following Detailed Description, taken in conjunction with the drawings, in which.

DETAILED DESCRIPTION OF THE INVENTION

Figure 1:
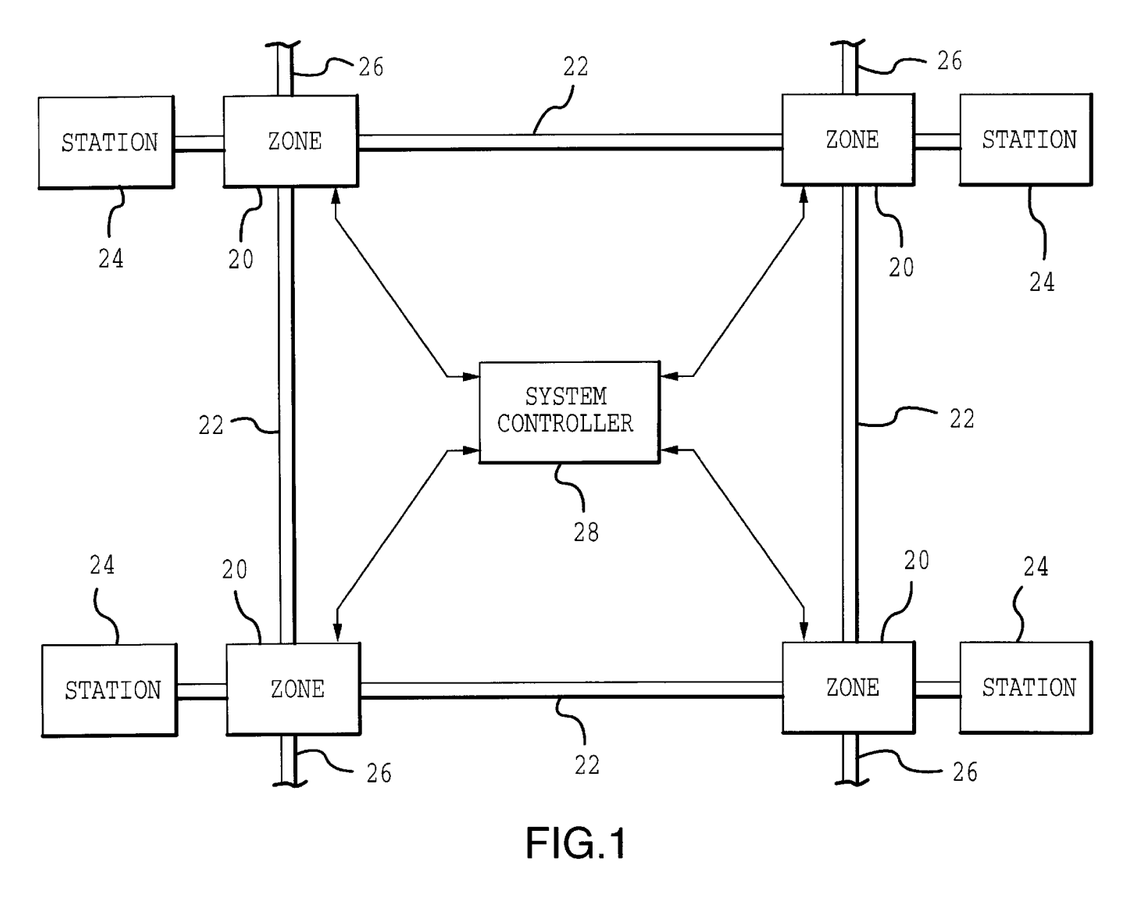
FIG. 1 is a block diagram of the pneumatic carrier system of the present invention.

A pneumatic carrier system for the movement of carriers from one point to another is illustrated in FIG. 1. The system includes zones 20, interzones 22, stations 24 and bypass pipes 26. The interzones 22 which connect the zones 20 are routes by which a carrier is pneumatically moved through the system. Each station 24 is connected to the system through a zone 20. Similarly, the bypass pipes 26 are connected to the system through zones 20. The present invention uses bypass pipes 26 connected to intermediate zones in the system to resolve gridlock situations. An intermediate zone is a zone 20 which is connected to at least two other zones. The bypass pipe 26 is used as a temporary destination for a transaction which is involved in a gridlock to permit another transaction to move through the interzone 22 previously occupied by the transaction which was re-routed to the bypass pipe 22. The system controller 28 communicates with the zones 20. The system controller 28 includes a digital processor and memory, and in one embodiment includes a programmable digital computer.

Figure 2:
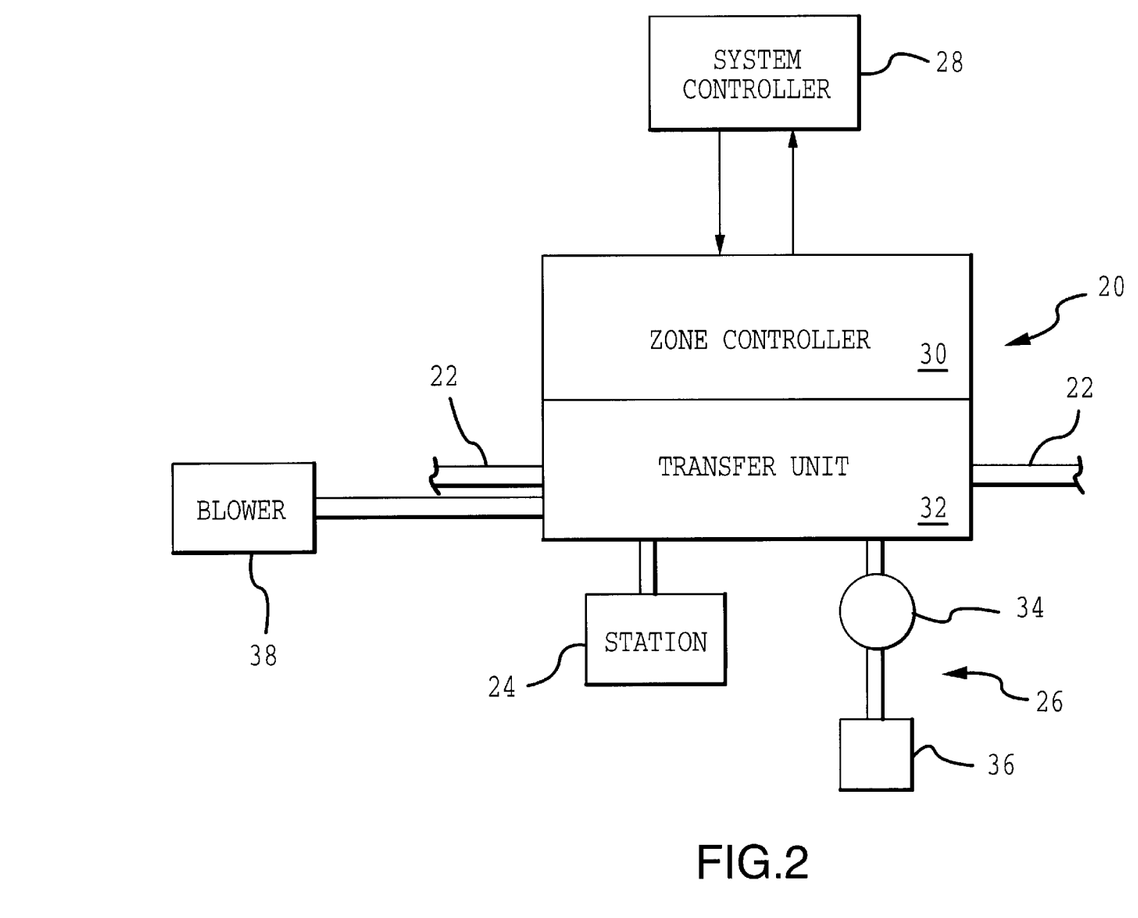
FIG. 2 is a block diagram illustrating some of the components of a zone.

Some of the components of zone 20 are shown in FIG. 2. The zone controller 30 communicates with the system controller 28. The zone controller also communicates with the transfer unit 32, which handles physical switching to control movement of carriers in accordance with instructions received from the zone controller. The transfer unit 32 is the physical point of connection at the zone for interzones 22, a station 24, a blower 38 and a bypass pipe 26. In one embodiment, the bypass pipe 26 includes a vacuum bypass 36 and a pressure relief valve 34 which allow the carrier associated with a transaction to be moved into and out of the bypass pipe 26. When a number of carriers are in the system at the same time, the possibility of gridlock arises. Generally, gridlock occurs when two or more carriers are unable to continue moving in the system because of a conflict in the intended paths of each carrier. Two types of gridlock which have been identified are zone gridlock and system gridlock.

Figure 3:
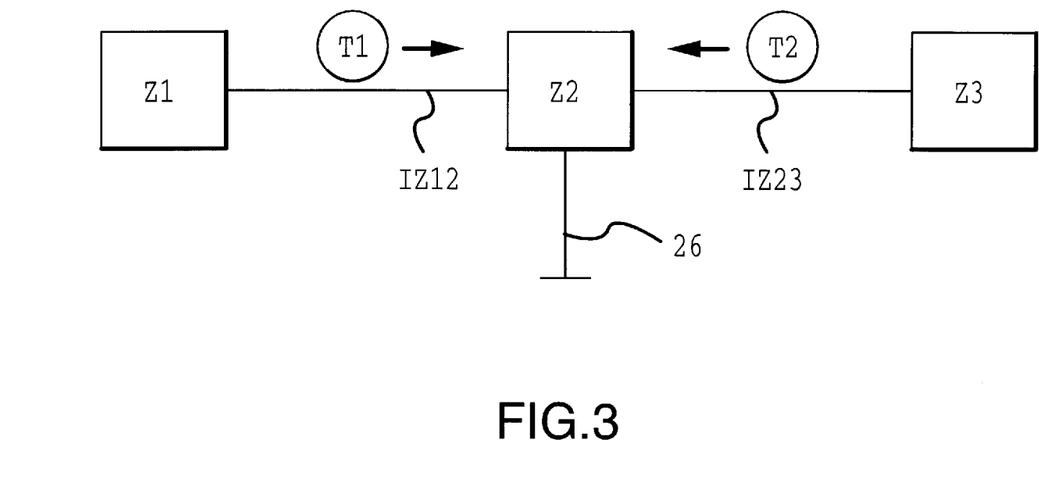
FIG. 3 is a diagram illustrating a zone gridlock condition.

An example of zone gridlock is illustrated in FIG. 3. Zone Z1 is connected to zone Z2 by interzone IZ12. Zone Z2 is also connected to zone Z3 by interzone IZ23. The two carriers involved in this example are represented as transactions T1 and T2. A transaction is the object used by the control system to represent a physical carrier in the system, and it includes transaction information associated with the transaction. The transaction information is used by the control system in controlling the flow of transactions. For each transaction, the transaction information includes an initial source, an ultimate destination, a present source, and an immediate destination. Transaction information also includes a unique identifier, such as a number, associated with every transaction, and an assigned priority, which is initially derived from the sum of the send priority of the source station and the receive priority of the destination station. The priority of a transaction may be changed in the course of movement of the carrier associated with the transaction through the system.

In FIG. 3, the present source of transaction T1 is the present location of the transaction, namely interzone IZ12. The immediate destination of transaction T1 is interzone IZ23, which is occupied by transaction T2. The present source of transaction T2 is interzone IZ23, and its immediate destination is interzone IZ12, which is occupied by transaction T1. Since two carriers cannot physically pass each other going in opposite directions in an interzone, a zone gridlock condition exists at zone Z2. The gridlock condition may be resolved by the use of the bypass pipe 26 which is connected to zone Z2. The bypass pipe 26 provides a location where a transaction involved in a gridlock condition may be temporarily routed, thus permitting another transaction to move forward into the previously occupied interzone.

In the example shown in FIG. 3, the zone gridlock may be resolved by temporarily routing transaction T1 to the bypass pipe 26 for long enough to permit transaction T2 to move into interzone IZ12, after which transaction T1 is moved out of the bypass pipe 26 and into interzone IZ23. Each transaction then proceeds toward its ultimate destination.

Figure 4:
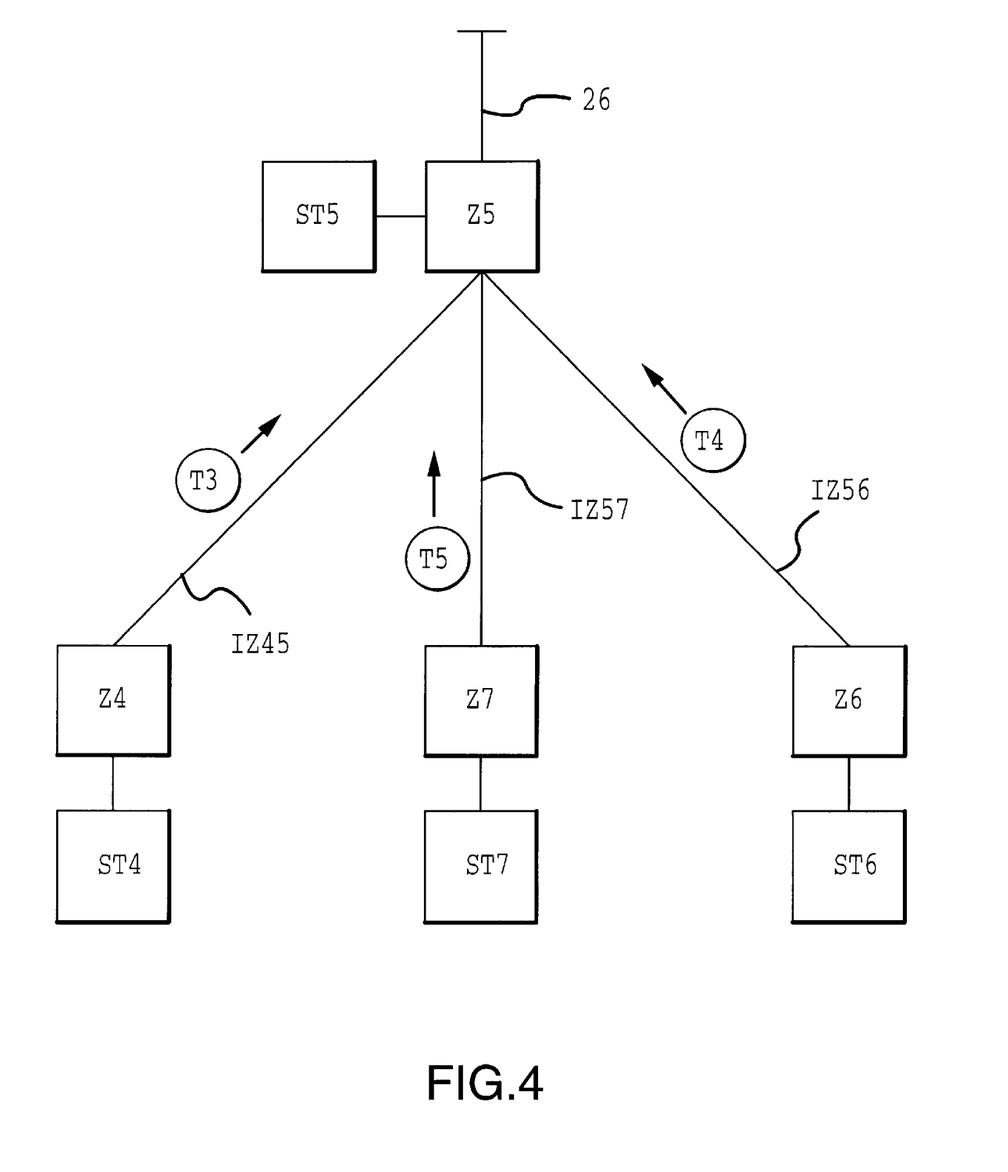
FIG. 4 is a diagram illustrating another form of a zone gridlock condition.

Another example of a zone gridlock condition involving more than a single pair of transactions is illustrated in FIG. 4. Three zones, Z4, Z7 and Z6, are all connected to zone Z5. Since zone Z5 is an intermediate zone, it is connected to a bypass pipe 26. Station ST5 is also connected to zone Z5. In similar fashion, stations ST4, ST7 and ST6 are connected to zones Z4, Z7 and Z6, respectively, which are in turn connected to zone Z5 by interzones IZ45, IZ57 and IZ56.

The transaction information for each transaction includes an associated route list. The route list identifies the path of the transaction through the system. When a transaction is processed, the control system issues commands to cause the carrier associated with the transaction to move in accordance with the instructions in the route list. For transaction T3 the source is station ST4 and its ultimate destination is station ST6. Its present source is IZ45 and its immediate destination is IZ56. The initial route list associated with transaction T3 is therefore:

ST4→IZ45
IZ45→IZ56
IZ56→ST6

For transaction T5 the source is station ST7 and its ultimate destination is station ST4. Its present source is IZ57 and its immediate destination is IZ45. The initial route list associated with transaction T5 is therefore:

ST7→IZ57
IZ57→IZ45
IZ45→ST4

For transaction T4 the source is station ST6 and its ultimate destination is station ST7. Its present source is IZ56 and its immediate destination is IZ57. The initial route list associated with transaction T4 is therefore:

ST6→IZ56
IZ56→IZ57
IZ57==>ST7

Since the immediate destination of each of the group of transactions T3, T4 and T5 is occupied by one of the other transactions, none of the transactions can move forward, creating a gridlock condition. The gridlock condition may be resolved by identifying a pair of transactions involved in the gridlock at the zone and temporarily routing one of the pair of transactions to a bypass pipe 26 connected to the zone, thus freeing the path of the other transactions.

Figure 5:
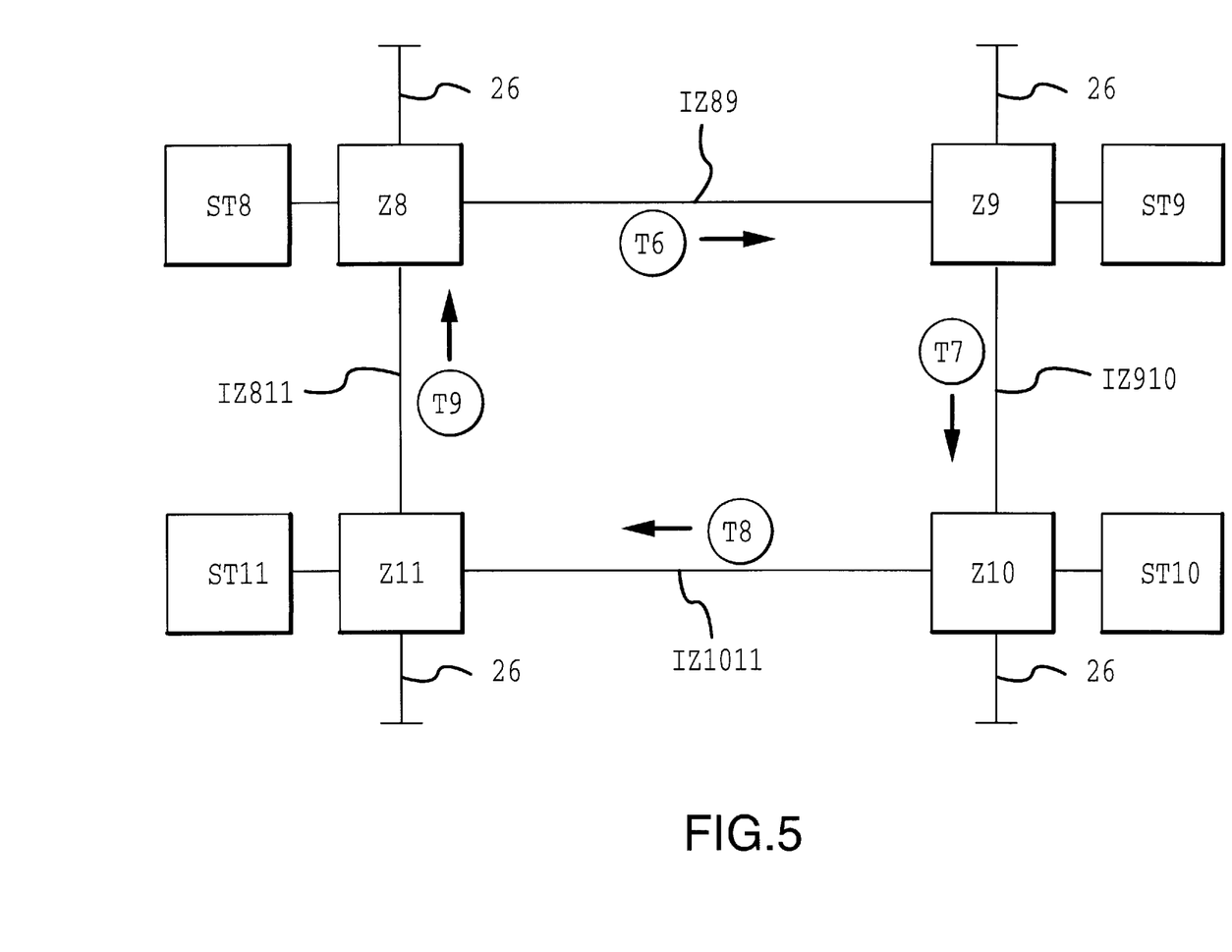
FIG. 5 is a diagram illustrating a form of a system gridlock condition.

In contrast to zone gridlock, where at least one pair of transactions are prevented from proceeding in opposed paths, system gridlock may occur even when transactions are not routed on opposing paths. An example of system gridlock, or cycle occurrence gridlock, is illustrated in FIG. 5, which shows zones Z8, Z9, Z10 and Z11. A bypass pipe 26 is connected to each zone, as are corresponding stations ST8, ST9, ST10, and ST11. Zones Z8, Z9, Z10 and Z11 are connected by interzones IZ89, IZ910, IZ1011 and IZ811. Transaction T6 presently occupies interzone IZ89 and has an immediate destination of interzone IZ910, which is occupied by transaction T7. Transaction T7 has an immediate destination of interzone IZ1011, which is occupied by transaction T8. Transaction T8 has an immediate destination of interzone IZ811, which is occupied by transaction T9. Transaction T9 has an immediate destination of interzone IZ89, which is occupied by transaction T8. Since the immediate destination of each of the transactions is occupied by another transaction which is unable to proceed, a gridlock condition exists. The system gridlock is resolved by identifying a pair of relieving transactions and rerouting one of the pair of relieving transactions to create a zone gridlock condition at an intermediate zone. The resulting zone gridlock condition is resolved by the use of a bypass pipe connected to the zone where the zone gridlock was created.

Figure 6:
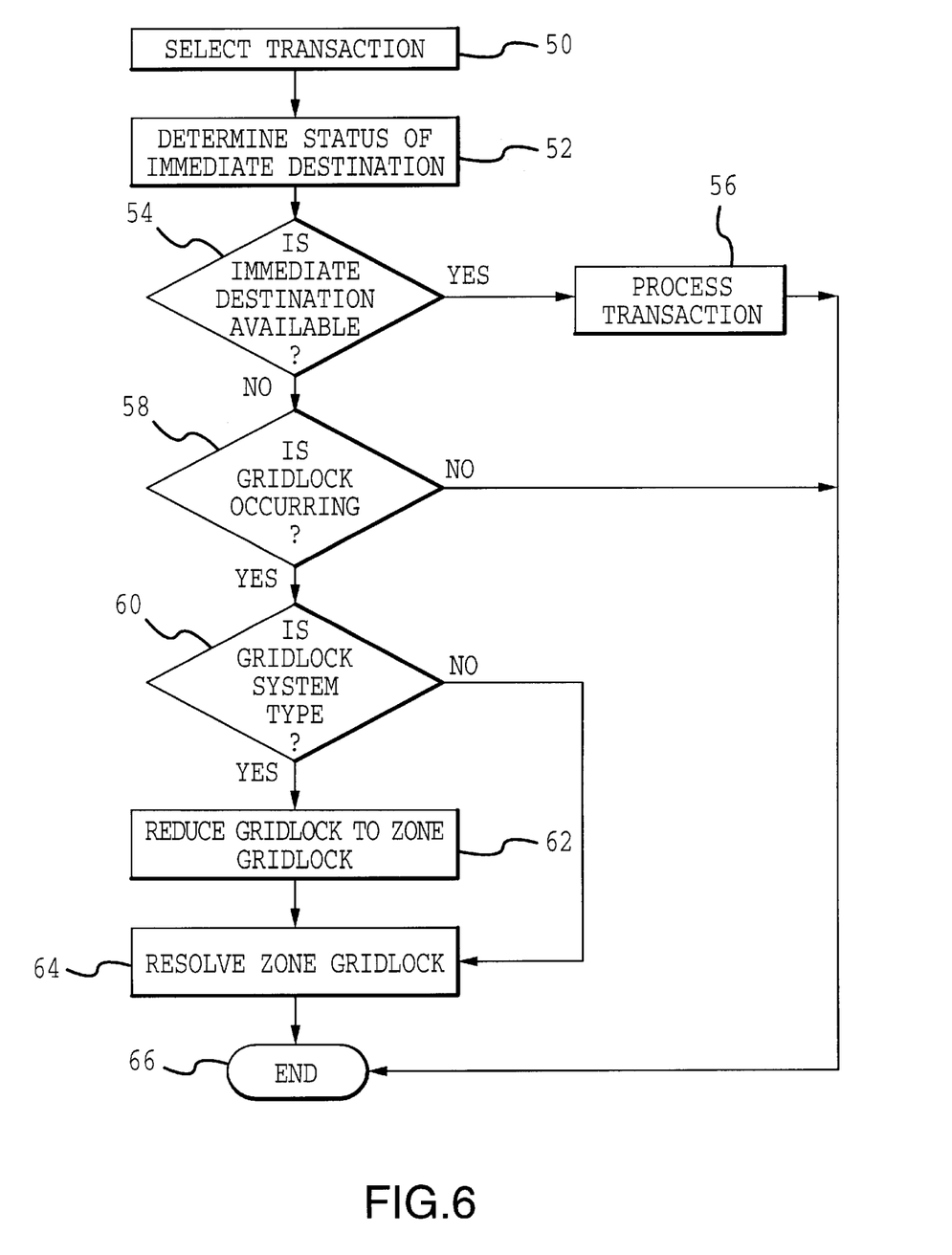
FIG. 6 is a flow chart illustrating certain gridlock alleviation features of the present invention.
Figure 7:
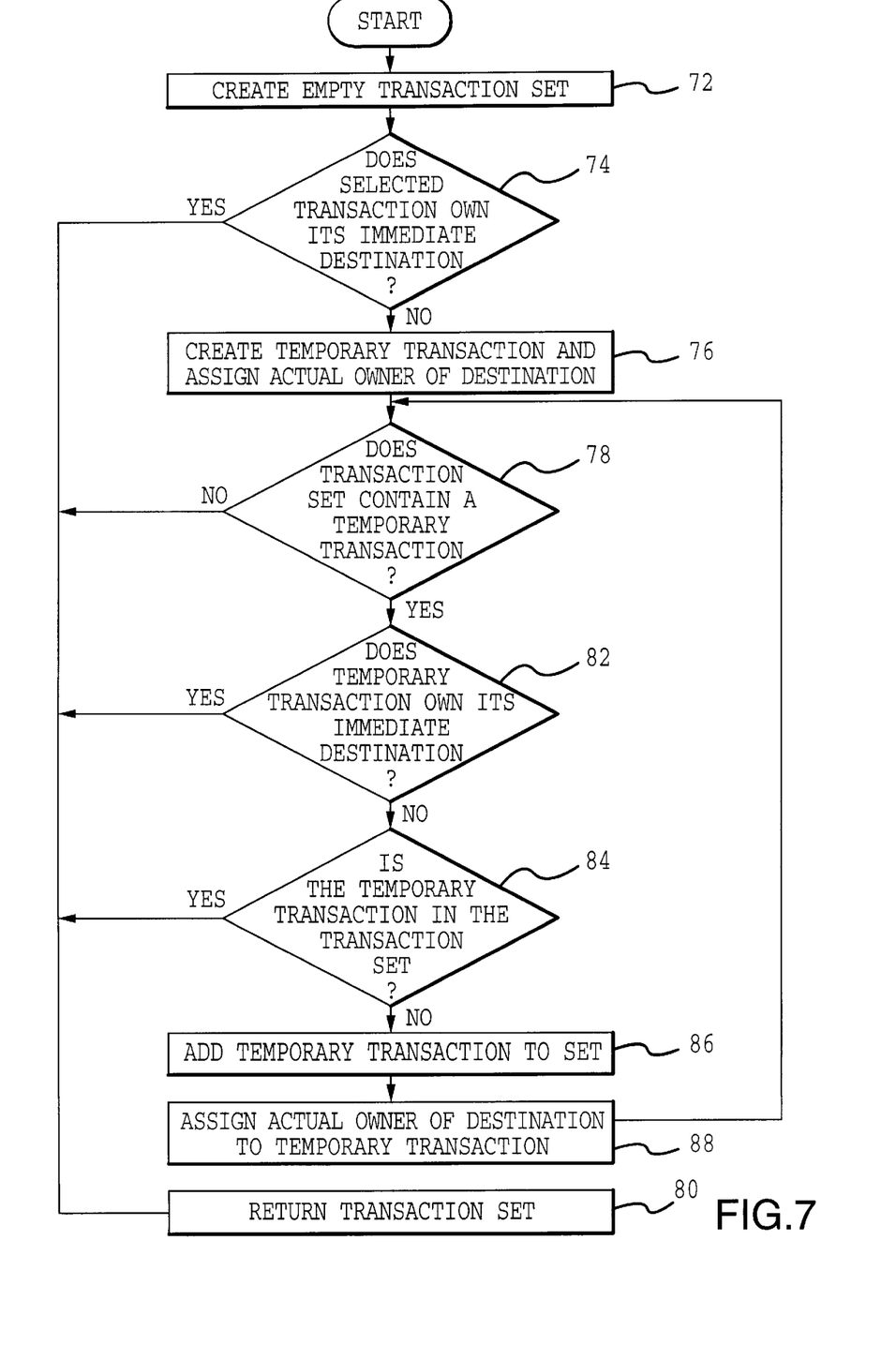
FIG. 7 is a flow chart illustrating a process for identifying a set of transactions which are involved in a gridlock condition.

The detection of zone and system gridlock conditions is performed by the control system. In one embodiment of the present invention, the control system includes a system controller 28 and zone controllers 30. A flow chart illustrating the processing of transactions to detect and alleviate gridlock according to one embodiment of the invention is shown in FIG. 6. First, at step 50, a transaction is selected for processing. The transaction is selected from the transactions stored in a pending transaction queue. Initially, the transaction having the highest priority of the transactions in the queue will be selected. A pending transaction queue may include all transactions in the system or may include only certain transactions, such as those transactions associated with a particular zone. Next, at step 52, the immediate destination of the selected transaction is identified and the status of the immediate destination is determined. Possible destinations include stations 24, interzones 22 and bypass pipes 26. The control system has the capability to determine the present status of sources and destinations. For example, the status of a destination station 24 may be ON, OFF, FULL, or on ALARM condition. The status of an interzone 22 or a bypass pipe 26 is derived from information communicated by an associated zone controller 30 to the system controller 28. The status of a destination interzone 22 may be OCCUPIED, FREE or RESERVED, and the status of a bypass pipe 26 may be OCCUPIED, FREE or RESERVED.

Next, at step 54, if the immediate destination of the selected transaction is available, at step 56 the selected transaction is processed and the control system issues instructions to move the carrier associated with the selected transaction to the immediate destination. If the immediate destination of the selected transaction is not available, the processing moves to step 58.

At step 58, the control system determines whether a gridlock is occurring. The control system uses transaction information and status information to identify a group of transactions which are involved in a gridlock condition. This group includes the transactions which are unable to move forward because the immediate destination interzone of each transaction is occupied or reserved by a transaction which is also unable to move forward to its immediate destination because of the presence of a transaction. The group may include two or more transactions. The process for identifying the transactions involved in a gridlock condition is discussed in more detail with reference to FIG. 7.

If gridlock is not occurring, as in the case when the information relating to the status of the destination interzone indicates that the interzone is RESERVED, or that the occupying transaction is only waiting in interzone storage, processing flows to step 66. If a gridlock condition is found, processing flows to step 60.

At step 60, if the gridlock condition is a zone gridlock, processing flows to step 64. If the gridlock condition is a system gridlock, processing flows to step 62, where the system gridlock is reduced to a zone gridlock and processing then flows to step 64. At step 64, the zone gridlock is resolved and processing flows to step 66.

In one embodiment of the present invention, the process of searching for a gridlock condition is initiated when a selected transaction is unable to move forward. The reason for the inability to move forward is identified by querying the status of the immediate destination. If the reason that the selected transaction is unable to move forward is due to an occupying transaction in the immediate destination interzone, the status of the immediate destination interzone of the occupying transaction is queried to determine the reason for its presence. If the occupying transaction is similarly unable to move forward due to the presence of a transaction in the occupying transaction's immediate destination interzone, a gridlock condition may exist. In order to identify all of the transactions in the group of transactions involved in the gridlock, the process of querying the next immediate destination for status is repeated for each subsequent occupying transaction, until either the occupying transaction is found to be the initially selected transaction or all of the transactions have been identified.

In a simple zone gridlock condition, the initially selected transaction and the first occupying transaction may be the cause of the gridlock condition, as illustrated in FIG. 3. In such a case, the group of transactions involved in the gridlock includes only that pair of transactions, and the gridlock condition may be identified as a zone gridlock because the paths of the pair of transactions are in opposed directions at a zone. The group of transactions involved in a gridlock may include more than a single pair of transactions. In FIG. 4, the group of transactions involved in the gridlock includes T3, T4 and T5. In this group of transactions, two pairs of transactions exist which identify the existence of a zone gridlock condition, namely the pair of transactions T3 and T4 and the pair of transactions T3 and T5. The condition shown in FIG. 4 is recognized as a zone gridlock condition at zone Z5 because either of these pairs have paths which are in opposed directions at zone Z5.

With reference to FIG. 5, the group of transactions involved in the gridlock condition are transactions T6, T7, T7 and T8. None of the pairs of transactions have paths in opposed directions at a zone, identifying this condition as a system gridlock condition.

FIG. 7 illustrates a process for identifying a set of transactions involved in a gridlock condition according to one embodiment of the invention. When this routine is called, it creates a transaction set which contains the transactions involved in a gridlock condition. If there is no gridlock condition, the routine returns an empty set. Initially, a selected transaction has been identified. An empty transaction set is created at step 72. Next, at step 74, the immediate destination of the selected transaction is identified and the ownership of the immediate destination of the selected transaction is also determined. A destination is owned by a transaction when it is reserved for the use of that transaction. If the immediate destination is owned by the selected transaction, the process flows to step 80, where an empty transaction set is returned to the processing step which called the routine.

If the immediate destination of the selected transaction is not owned by the selected transaction, at step 76 a temporary transaction is created and the transaction which is occupying or reserving the immediate destination of the selected transaction is assigned to the temporary transaction. A transaction may own a destination by occupying or reserving the destination. The processing then flows to step 78 where the contents of the transaction set are checked to determine whether the transaction set contains a temporary transaction. The processing then flows to step 82 to identify the immediate destination of the temporary transaction and determine if the immediate destination of the temporary transaction is owned by the temporary transaction. If the temporary transaction owns its immediate destination, processing flows to step 80 where the transaction set is returned to the processing step which called the routine. If the immediate destination of the temporary transaction is not owned by the temporary transaction, the contents of the transaction set are checked to determine whether the transaction assigned to the temporary transaction is already a member of the transaction set, step 84. If it is, at step 80 the transaction set is returned to the processing step which called the routine.

If the assigned transaction is not already a member of the set, at step 86 the transaction is added to the set. Next, at step 88, the transaction which occupies or is reserving the immediate destination of the temporary transaction is assigned to the temporary transaction, replacing the previously assigned transaction. Processing then returns to step 78 where the contents of the transaction set are again checked to determine if a temporary transaction exists. The flow of the process from step 78 through step 88 repeats until processing is transferred to step 80 at either step 82 or step 84. If an empty set is returned, the selected transaction is not involved in a gridlock. If a gridlock condition exists which involves the selected transaction, the set of transactions involved in the gridlock will be returned.

Figure 8:
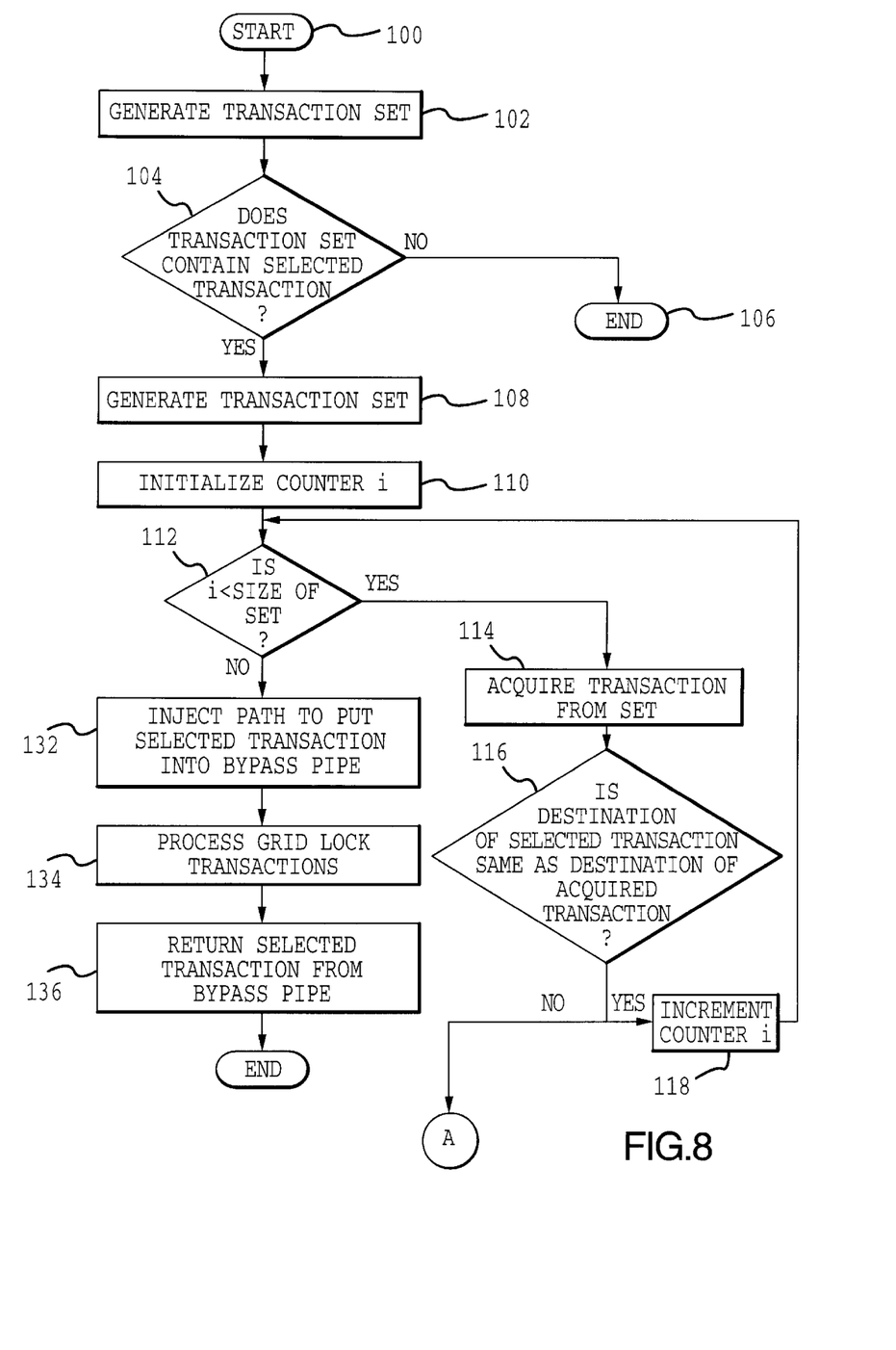
FIG. 8 is a flow chart illustrating a process for identifying the existence of a system gridlock condition and resolving a zone gridlock condition.
Figure 9:
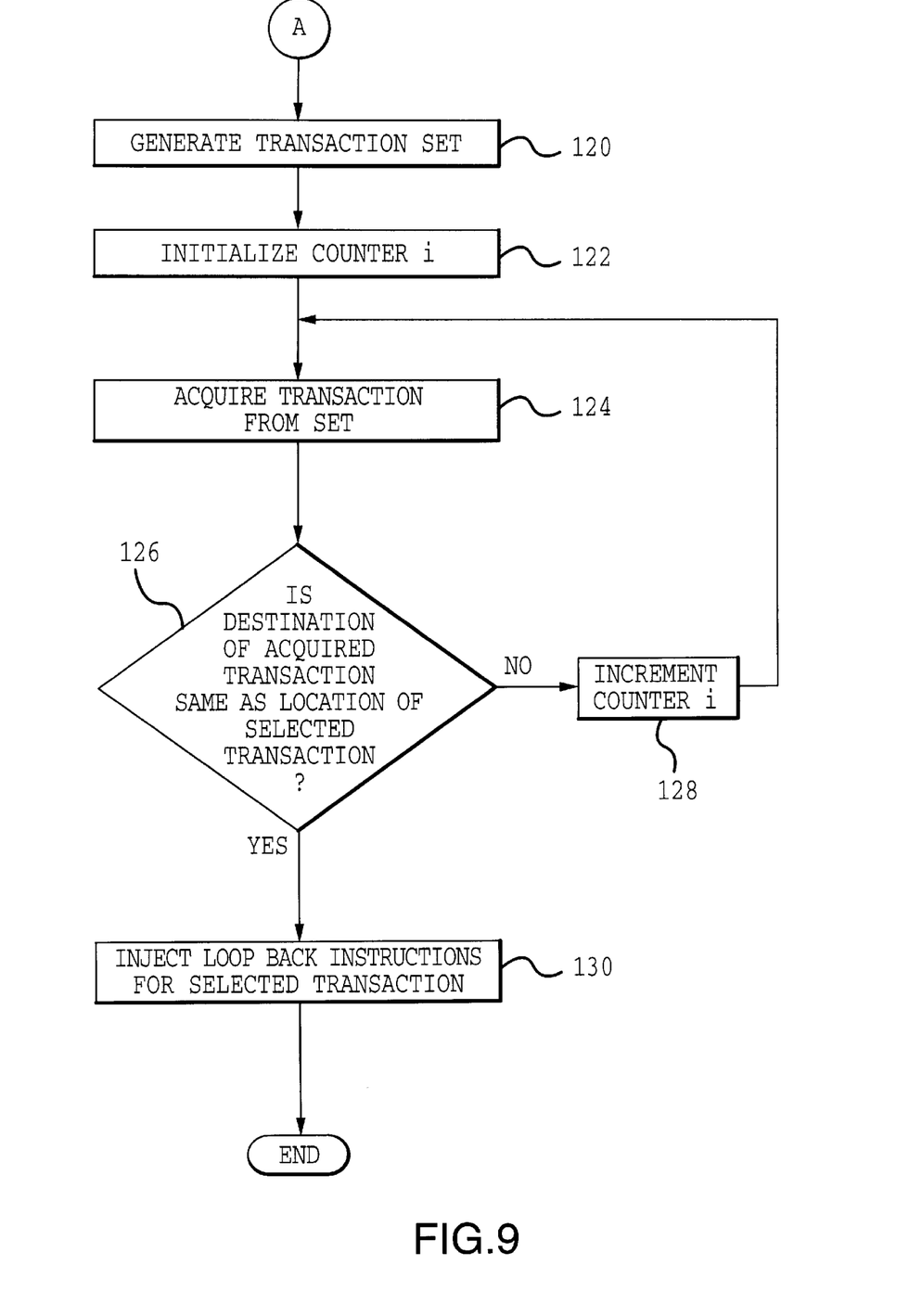
FIG. 9 is a flow chart illustrating a process for reducing a system gridlock condition to a zone gridlock condition.

A process for detecting gridlock, determining gridlock type, and resolving system gridlock and zone gridlock conditions according to one embodiment of the invention is illustrated in FIGS. 8 and 9. In FIG. 8, starting at step 100 with a selected transaction, the processing flows to step 102 which calls the routine illustrated in FIG. 7 to generate a transaction set. At step 104, the contents of the transaction set are checked to determine whether the transaction set contains the selected transaction. If it does not, the selected transaction is not involved in a gridlock and processing flows to step 106, and gridlock detection for that selected transaction ends.

If the transaction set generated at step 104 does contain the selected transaction, indicating that the selected transaction is involved in a gridlock condition, processing flows to step 108 where the transaction set is again generated using the routine shown in FIG. 7. At step 110, an index counter is initialized at zero. At step 112, if the value of the index counter is less than the number of transactions in the set, processing flows to step 114 where the value of the index counter is used to identify and acquire a transaction from the transaction set. At step 116, if the immediate destination of the selected transaction is the same as the immediate destination of the acquired transaction, the processing flows to step 118 where the index counter is incremented. Processing then returns to step 112. If, at step 116, the immediate destination of the selected transaction is not the same as the immediate destination of the acquired transaction, a system type gridlock condition exists and processing flows to step 120, shown in FIG. 9. When a system gridlock condition exists, the system gridlock may be reduced to a zone gridlock condition by modifying the routing instructions of one of the transactions involved in the system gridlock to force a zone gridlock condition to exist in a zone.

In one embodiment of the present invention, a zone gridlock is created by identifying a transaction in the set of transactions involved in a system gridlock which has, as its immediate destination, the location of the selected transaction. With reference to FIG. 5, if transaction T7 was the selected transaction, the identified transaction would be transaction T6. After the pair of the selected transaction T7 and the identified transaction T6 is determined, the routing instructions for the selected transaction may be modified to redirect selected transaction T7 back towards zone Z9, forcing a zone gridlock condition at the zone. The zone gridlock may then be resolved by routing one of the transactions to a bypass pipe at the zone.

FIG. 9 illustrates this method for identifying the pair of transactions and forcing zone gridlock. Initially, the selected transaction is known. At step 120 a transaction set is generated by calling the routine shown in FIG. 7. At step 122, an index counter is initialized. At step 124, the index counter is used to acquire a transaction from the transaction set using the index counter value. At step 126, the status of the immediate destination of the acquired transaction is determined. If the immediate destination of the acquired transaction is not occupied by the selected transaction, processing flows to step 128 where the index counter is incremented and the cycle repeated. If the immediate destination of the acquired transaction is occupied by the selected transaction, the processing flows to step 130 where instructions are injected into the route list for the selected transaction to cause a selected transaction to loop back, thus creating a forced zone gridlock condition. Following the injection of the loop back instructions into the route list for the selected transaction, the processing may be returned to step 100, FIG. 8 for resolution of the zone gridlock condition.

In another embodiment of the invention, system gridlock is reduced to a zone gridlock using a misordered pair of transactions. A misordered pair is a pair of transactions which have associated numbers which are not in numerical order. With reference again to FIG. 5, the transaction set involved in the system gridlock consists of transactions T6, T7, T8 and T9. Possible pairs of relieving transactions are T6, T7; T7, T8; T8, T9; and T9, T6. In this transaction set the misordered pair is T9, T6. A zone gridlock condition may be forced by choosing one of the pair, such as the lower numbered of the pair, and modifying its routing instructions to redirect the chosen transaction to force a gridlock.

An example of the injection of loopback instructions may be illustrated with reference to the system gridlock condition in FIG. 5. The misordered pair of T9 and T6 are identified as the pair of relieving transactions. Initially, the route lists of these two transactions are as follows:

| T6 | T9 |
|---|---|
| ST8 ==> IZ89 | ST11 ==> IZ811 |
| IZ89 ==> IZ910 | IZ811 ==> IZ89 |
| IZ910 ==> ST10 | IZ89 ==> ST9 |

The path of transaction T6 is away from zone Z8, resulting in the selection of transaction T6 as the first relieving transaction. Transaction T6 is rerouted back toward zone Z8 by injecting back loop instructions into the route list associated with T6, resulting in the following:

| T6 | T9 |
|---|---|
| ST8 ==> IZ89 | ST11 ==> IZ811 |
| ZI89 ==> IZ811 (injected) | IZ811 ==> IZ8 |
| IZ811 ==> IZ89 (injected) | IZ89 ==> ST9 |
| IZ89 ==> IZ910 | |
| IZ910 ==> ST10 | |

The injection of the back loop into the route list of transaction T6 causes a zone gridlock condition to exist at the zone between the present sources of the two transactions comprising the identified relieving pair, in this case zone Z8.

Returning to FIG. 8, a zone gridlock condition may exist as a result of system operation, or as a result of forcing a zone gridlock to reduce a system gridlock condition. When a zone gridlock condition exists, the processing flows from step 100 to step 102 where the transaction set of the transactions involved in the zone gridlock is generated by calling the routine shown in FIG. 7. At step 104, a zone gridlock which involves the selected transaction will cause the processing to flow to step 108, where the transaction set is again generated. At step 110, an index counter is initialized at zero. At step 112, if the value of the index counter is less than the number of transactions in the set, processing flows to step 114 where the value of the index counter is used to identify and acquire a transaction from the transaction set.

At step 116, if the immediate destination of the selected transaction is the same as the immediate destination of the acquired transaction, the processing flows to step 118 where the index counter is incremented. Processing then returns to step 112. If the immediate destination of the selected transaction is not the same as the immediate destination of the acquired transaction at step 116, a system type gridlock condition exists and processing flows to step 120. When a zone gridlock condition exists, processing flows to step 132, where instructions are injected into the route instructions of the selected transaction to put the selected transaction into the bypass pipe attached to the zone at which the gridlock occurs. Processing then flows to step 134, where the acquired transaction is then processed to move it past the zone where the selected transaction is in the bypass pipe and, if necessary, the other transactions involved in the gridlock are processed past the bypass pipe zone in order to resolve the gridlock. After such transactions are processed, the transaction in the bypass pipe is returned to the system from the bypass pipe, step 136 and the processing of the gridlock condition ends.

An example of the resolution of a zone gridlock condition created by the reduction of a system gridlock condition may be illustrated with further reference to FIG. 5. The reduction of the system gridlock condition results in a zone gridlock condition at zone Z8. The identified pair of relieving transactions is T6 and T9. Transaction T6 is selected as the bypass transaction and routed to the bypass pipe connected to zone Z8 by injecting bypass routing instructions into the route list associated with transaction T6, as follows:

| T6 |
| --- |
| ST8 ==> IZ89 |
| IZ89 ==> Bypass (injected) |
| Bypass ==> IZ89 (injected) |
| IZ89 ==> IZ811 |
| IZ811 ==> IZ89 |
| IZ89 ==> IZ910 |
| IZ910 ==> ST10 |

The injection of the bypass routing instructions into the route list for transaction T6 causes transaction T6 to be moved to bypass pipe 26. Thereafter, the other transactions involved in the system gridlock, in this case T7, T8 and T9, may continue until at least one transaction has either reached its ultimate destination or has otherwise moved out of the interzones involved in the system gridlock. Transaction T6 may then be moved out of bypass 26 and proceed to its immediate destination.

An example of the resolution of a zone gridlock condition which is not created by the reduction of a system gridlock condition may be illustrated with further reference to FIG. 4. The transactions in the gridlock transaction group list would be transactions T3, T4 and T5. The misordered pair T3 and T5 is identified as the pair of relieving transactions. Transaction T3 is selected as the bypass transaction and routed into the bypass pass 26 by injecting a bypass loop into the route list associated with transaction T3 as follows:

| |
| --- |
| ST4 ==> IZ45 |
| IZ45 ==> Bypass (injected) |
| Bypass ==> IZ45 (injected) |
| IZ45 ==> IZ56 |
| IZ56 ==> ST6 |

The injection of the bypass routing instructions into the route list for transaction T3 causes T3 to be moved to bypass pipe 26. Thereafter, transaction T5 may move to its immediate destination interzone IZ45 and transaction T4 may then move to its immediate destination interzone IZ57. When transaction T5 has left interzone IZ45, transaction T3 may move back into interzone IZ45 and then proceed to interzone IZ56.

The foregoing discussion has been presented for purposes of illustration and description. Further, the description is not intended to limit the invention to the form disclosed herein. Variation and modification commensurate with the above teachings, within the skill and knowledge of the relevant art, are within the scope of the present invention. The embodiments described herein above are further intended to explain the best modes presently known of practicing the invention and to enable others skilled in the art to utilize the invention as presented, or in other embodiments, and with the various modifications required by their particular applications or uses of the invention. It is intended that the appended claims be construed to include alternative embodiments to the extent permitted by the prior art.

What is claimed is:

1. A method for alleviating gridlock in a pneumatic carrier transport system having a plurality of paths along which a plurality of carriers are movable in accordance with transaction information wherein a first of said plurality of carriers is associated with first transaction information including information relating to a first predetermined route using at least a first of said plurality of paths and a second of said plurality of carriers is associated with second transaction information including information relating to a second predetermined route using at least one of said first path and a second of said plurality of paths, said method comprising the steps of:

moving at least said first of said plurality of carriers along at least said first of said plurality of paths in a first direction using said first transaction information;

moving at least said second of said plurality of carriers along at least said one of said first and said second of said plurality of paths in a second direction using said second transaction information wherein at least a portion of said moving at least said second of said plurality of carriers step occurs during said moving of at least said first of said plurality of carriers step;

determining a gridlock condition involving at least said first and said second of said plurality of carriers exists, whereby said first and said second of said plurality of carriers using at least said first of said plurality of paths and at least said one of said first and said second of said plurality of paths, respectively, are inhibited from proceeding in accordance with said first and said second transaction information, respectively; and controlling movement of at least said first of said plurality of carriers based on said gridlock condition to resolve said gridlock condition by moving said first of said plurality of carriers in a direction opposite said first direction using said first of said plurality of paths, said first of said plurality of paths adapted for bi-directional movement of at least said first of said plurality of carriers.

2. A method, is claimed in claim 1, wherein:
said determining step includes checking said information associated with said first and second transaction information in a queue and making a selection based on said information.

3. A method, as claimed in claim 2, wherein:
said predetermined information includes priority information for said first and said second of said plurality of carriers.

4. A method, as claimed in claim 1, wherein:
a third of said plurality of carriers is associated with third transaction information including information related to a third predetermined route using at least one of said first, said second and a third of said plurality of paths, wherein said determining step includes identifying an immediate destination, different from first, second and third ultimate destinations of at least said first of said plurality of carriers.

5. A method, as claimed in claim 1, wherein:
said moving steps cause said gridlock condition in which each of said first and said second of said plurality of carriers has a present location and an immediate destination that are part of said first and said second predetermined routes, respectively, and wherein said immediate destination of said second of said plurality of carriers is the same as said present location of said first of said plurality of carriers, wherein said second direction of said second of said plurality of carriers is opposite said first direction of said first of said plurality of carriers.

6. A method, as claimed in claim 1, wherein:
said determining step includes ascertaining that said first, said second, and said third of said plurality of carriers are involved in said gridlock condition.

7. A method, as claimed in claim 1, wherein:
each of said first and said second predetermined routes includes an immediate destination different from an ultimate destination of said first and said second of said plurality of carriers, respectively; and
said determining step is related to ascertaining whether said immediate destination of said second of said plurality of carriers is toward or away from said immediate destination of said first of said plurality of carriers in connection with identifying a type of said gridlock condition.

8. A method, as claimed in claim 1, wherein:
said determining step includes checking predetermined information associated with each of said first and said second transaction information and conducting said controlling step based on said predetermined information.

9. A method, as claimed in claim 1, wherein:
said determining step includes identifying a misordered pair related to at least one of said first and said second of said plurality of carriers using said first and said second transaction information and conducting said controlling step based on said identifying of said misordered pair.

10. A method, as claimed in claim 1, wherein:
said determining step includes modifying said first transaction information to add instructions to move said first of said plurality of carriers to an alternative location by moving said first of said plurality of carriers in said direction opposite said first direction when said controlling step is conducted.

11. A method, as claimed in claim 1, wherein:
said controlling step includes causing said first of said plurality of carriers to move to an alternative location, which is different from said first predetermined route.

12. A method, as claimed in claim 11, wherein:
said alternative location includes a bypass location.

13. A method, as claimed in claim 1, wherein said determining step comprises the steps of:
establishing that said gridlock condition is a system gridlock condition, wherein said second direction of said second of said plurality of carriers is the same as said first direction of said first of said plurality of carriers; and
reducing said system gridlock condition to a zone gridlock condition.

14. A method, as claimed in claim 1, wherein:
said determining step includes establishing that said gridlock condition is a system gridlock condition; and
said controlling step includes moving said first of said plurality of carriers in said opposite direction along at least said first of said plurality of paths.

15. A pneumatic apparatus for conveying material from source locations to destination locations in a plurality of carriers, wherein at least a first, a second, and a third of said plurality of carriers for transportation of materials is associated with a first, a second, and a third transaction information including information related to first, second, and third predetermined routes, respectively, wherein at least said first of said plurality of carriers is movable in at least a first direction, comprising:
path means including bi-directional main path means along which said first, said second, and said third of said plurality of carriers are moveable toward first, second, and third ultimate destinations, respectively, in at least one of said first direction and a second direction along said bi-direction main path means; and
system means including system controller means for controlling movement of at least said first, said second and said third of said plurality of carriers through said path means;
wherein said system means uses said first, second and third transaction information associated with said first, said second and said third of said plurality of carriers, respectively, to determine a first gridlock condition in which at least two of said first, said second and said third of said plurality of carriers are prevented from proceeding along at least two of said first, said second and said third predetermined routes, respectively, wherein said system controller means controls at least said first of said plurality of carriers to cause movement of said first of said plurality of carriers in said path means differently from said predetermined route of said first of said plurality of carriers, in a direction opposite said first direction to resolve said first gridlock condition.

16. A pneumatic apparatus, as claimed in claim 15, wherein:
said system means includes zone controller means and transfer unit means for directing the movement of said first, said second and said third of said plurality of carriers and in which said system controller means communicates with said zone controller means.

17. A pneumatic apparatus, as claimed in claim 15, wherein:

said first, said second, and said third transaction information corresponding to said first, said second and said third of said plurality of carriers includes predetermined information related to said first, said second and said third ultimate destinations of said first, said second and said third of said plurality of carriers, wherein said first of said plurality of carriers is selected for an immediate destination associated with said predetermined route of said first of said plurality of carriers.

18. A pneumatic apparatus, as claimed in claim 15, wherein:

said system means controls said first of said plurality of carriers to move along said bi-directional main path means in said opposite direction from said first direction associated with said predetermined route of said first of said plurality of carriers when said first gridlock condition exists, said opposite direction being said second direction.

19. An apparatus, as claimed in claim 15, wherein:

said system means includes means for determining whether said gridlock condition is one of a system gridlock condition and a zone gridlock condition.

20. An apparatus, as claimed in claim 15, wherein:

said system means includes zone controller means and in which said system controller means communicates with said zone controller means and is unable to communicate directly with each of said plurality of carriers.

21. A pneumatic apparatus, as claimed in claim 15, wherein:

of each said plurality of carriers is unable to communicate with said system controller means when at least one of said first, said second and said third of said plurality of carriers are located in at least sections of said bi-directional main path means.

22. A pneumatic apparatus, as claimed in claim 15, wherein:

said system means obtain information related movement of at least one of said first, said second and said third of said plurality of carriers independently of direct communication with said at least one of said first, said second and said third of said plurality of carriers.

\* \* \* \* \*